(12) United States Patent
Park et al.

(10) Patent No.: US 9,660,931 B2
(45) Date of Patent: May 23, 2017

(54) METHOD AND APPARATUS FOR RECEIVING OR TRANSMITTING RADIO FREQUENCY (RF) SIGNAL

(71) Applicant: LG ELECTRONICS INC., Seoul (KR)

(72) Inventors: Hanjun Park, Anyang-si (KR); Seungmin Lee, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/416,963

(22) PCT Filed: Jul. 25, 2013

(86) PCT No.: PCT/KR2013/006674
§ 371 (c)(1),
(2) Date: Jan. 23, 2015

(87) PCT Pub. No.: WO2014/017848
PCT Pub. Date: Jan. 30, 2014

(65) Prior Publication Data
US 2015/0215087 A1 Jul. 30, 2015

Related U.S. Application Data

(60) Provisional application No. 61/675,792, filed on Jul. 25, 2012.

(51) Int. Cl.
*H04L 12/911* (2013.01)
*H04L 12/26* (2006.01)
(Continued)

(52) U.S. Cl.
CPC ........ *H04L 47/788* (2013.01); *H04L 41/0896* (2013.01); *H04L 41/12* (2013.01);
(Continued)

(58) Field of Classification Search
CPC ..... H04B 7/024; H04B 7/2643; H04L 5/0007; H04L 5/0032; H04L 5/0035;
(Continued)

(56) References Cited

U.S. PATENT DOCUMENTS

2010/0246456 A1* 9/2010 Suo ...................... H04W 56/003
370/280
2011/0286440 A1* 11/2011 Chung .................. H04L 5/0048
370/342
(Continued)

FOREIGN PATENT DOCUMENTS

KR 10-2011-0033974 A 4/2011

*Primary Examiner* — Warner Wong
(74) *Attorney, Agent, or Firm* — Birch, Stewart, Kolasch & Birch, LLP

(57) ABSTRACT

A method and apparatus for receiving or transmitting a radio frequency (RF) signal are disclosed. A method for receiving a downlink signal by a user equipment (UE) in a Time Division Duplex (TDD) wireless communication system supporting Coordinated Multi-point transmission and reception (CoMP) includes: acquiring information of a time-resource region to which a downlink signal for the CoMP is transmitted, for at least one cell, and receiving a downlink signal for the CoMP signal for the CoMP on the basis of the acquired information, wherein the time-resource region information includes a length of a time region contained in a specific subframe to which the downlink signal for the CoMP is transmitted.

14 Claims, 8 Drawing Sheets

(51) Int. Cl.
*H04L 12/751* (2013.01)
*H04L 12/801* (2013.01)
*H04L 12/24* (2006.01)

(52) U.S. Cl.
CPC ............ *H04L 41/142* (2013.01); *H04L 41/16* (2013.01); *H04L 43/0894* (2013.01); *H04L 45/02* (2013.01); *H04L 47/12* (2013.01); *H04L 12/2439* (2013.01); *H04L 41/0823* (2013.01)

(58) Field of Classification Search
CPC ..... H04L 5/0048; H04L 5/005; H04L 5/0053; H04L 5/006; H04L 5/14; H04L 5/1469; H04W 24/08; H04W 72/1205
See application file for complete search history.

(56) References Cited

U.S. PATENT DOCUMENTS

| | | | |
|---|---|---|---|
| 2011/0317597 A1* | 12/2011 | Wan | H04W 72/1289 370/281 |
| 2012/0076039 A1 | 3/2012 | Kwon et al. | |
| 2012/0113955 A1 | 5/2012 | Cho et al. | |
| 2012/0184206 A1 | 7/2012 | Kim et al. | |
| 2012/0257553 A1* | 10/2012 | Noh | H04J 11/0053 370/280 |
| 2012/0281636 A1* | 11/2012 | Xiao | H04B 7/024 370/329 |
| 2013/0016705 A1* | 1/2013 | Zhang | H04L 5/0048 370/336 |
| 2013/0114565 A1* | 5/2013 | Chen | H04L 5/0053 370/330 |
| 2013/0195047 A1* | 8/2013 | Koivisto | H04W 72/0406 370/329 |
| 2013/0301570 A1* | 11/2013 | Xu | H04L 5/0073 370/329 |
| 2014/0036806 A1* | 2/2014 | Chen | H04W 72/0406 370/329 |
| 2015/0085715 A1* | 3/2015 | Sun | H04B 7/2656 370/280 |

* cited by examiner

FIG. 5
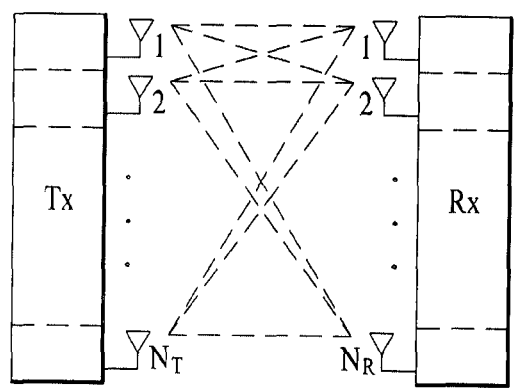
(a)
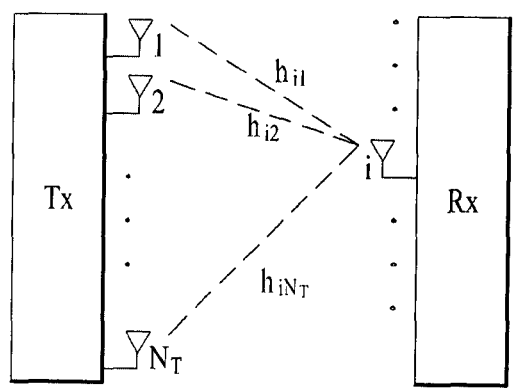
(b)

FIG. 6
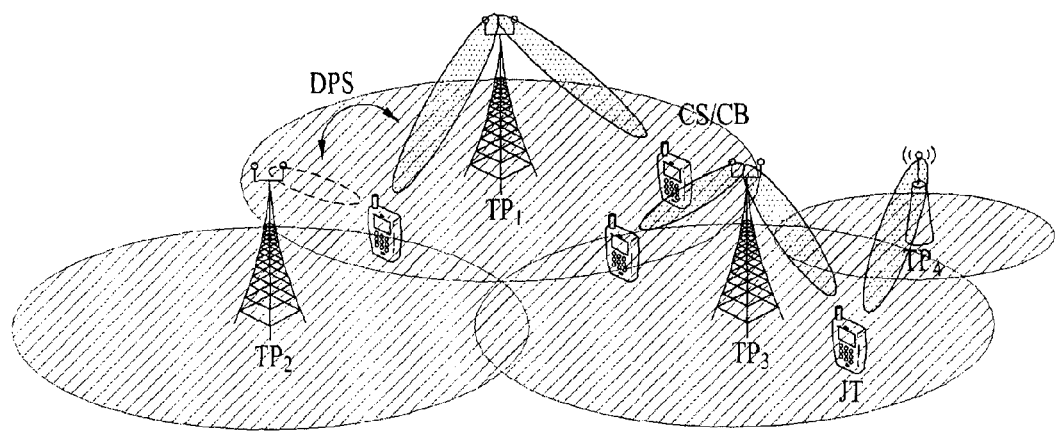
FIG. 7
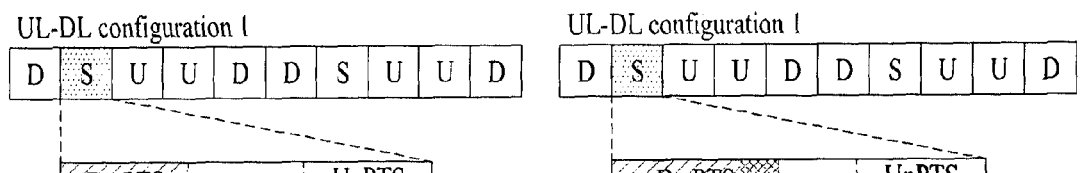
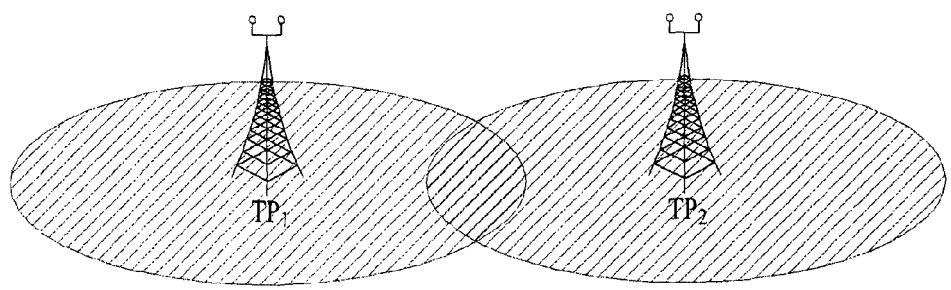

FIG. 8
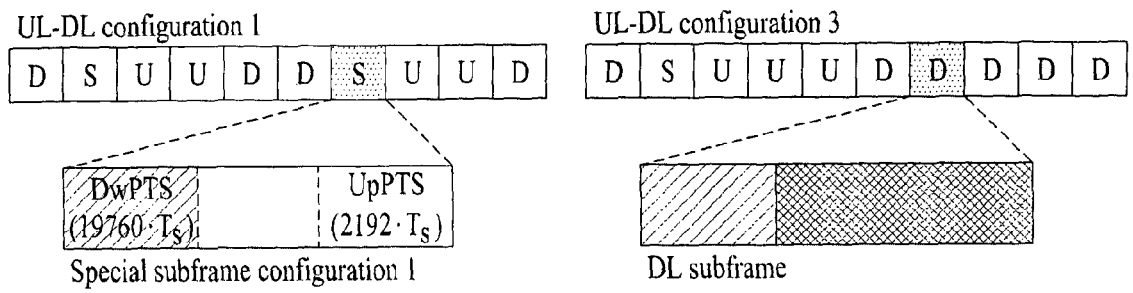
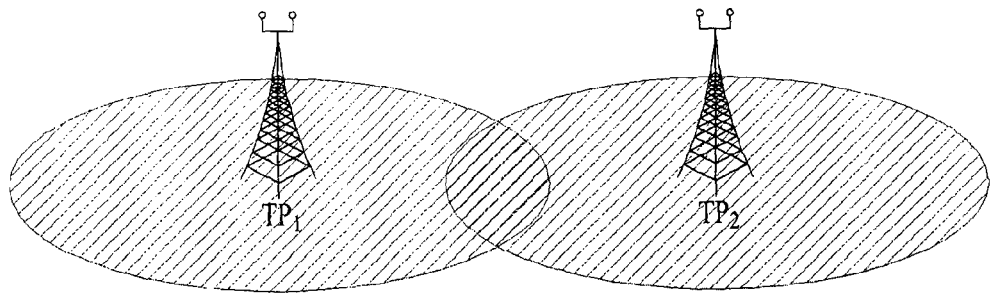
FIG. 9
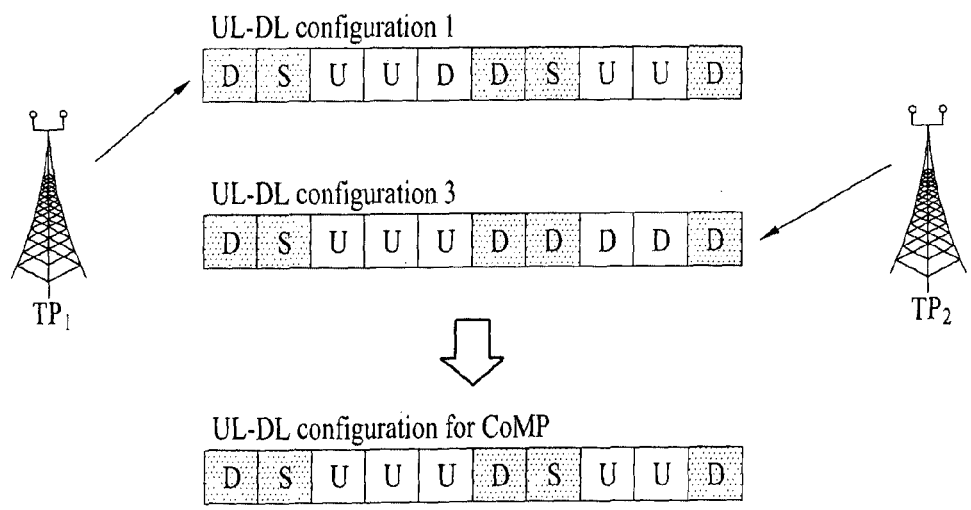

METHOD AND APPARATUS FOR RECEIVING OR TRANSMITTING RADIO FREQUENCY (RF) SIGNAL

CROSS REFERENCE TO RELATED APPLICATIONS

This application is the National Phase of PCT International Application No. PCT/KR2013/006674, filed on Jul. 25, 2013, which claims priority under 35 U.S.C. 119(e) to U.S. Provisional Application No. 61/675,792, filed on Jul. 25, 2012, all of which are hereby expressly incorporated by reference into the present application.

TECHNICAL FIELD

The present invention relates to a wireless communication system, and more particularly to a method and apparatus for receiving or transmitting a downlink signal.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention is to provide a method and apparatus for efficiently transmitting and receiving a downlink signal.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a downlink signal by a user equipment (UE) in a Time Division Duplex (TDD) wireless communication system supporting Coordinated Multi-point transmission and reception (CoMP) including: acquiring information of a time-resource region to which a downlink signal for the CoMP is transmitted, for at least one cell, and receiving a downlink signal for the CoMP signal for the CoMP on the basis of the acquired information, wherein the time-resource region information includes a length of a time region contained in a specific subframe to which the downlink signal for the CoMP is transmitted.

The time-resource region information may include a length of a downlink pilot time slot (DwPTS) of a special subframe of the at least one cell.

If the DL signal for the CoMP is transmitted from special subframes of at least two cells, the information of the time-resource region may include a minimum value from among the DwPTS length of the special subframes.

The time-resource region information may be received through higher layer signaling.

The time-resource region information may be indicated by a specific field contained in downlink control information.

The time-resource region information may be cell-specifically configured.

The method may further include measuring a channel quality of the time-resource region.

In accordance with another aspect of the present invention, a user equipment (UE) configured to receive a downlink signal in a Time Division Duplex (TDD) wireless communication system supporting Coordinated Multi-point transmission and reception (CoMP) includes a radio frequency (RF) unit; and a processor configured to control the RF unit.

The processor acquires information of a time-resource region to which a downlink signal for the CoMP is transmitted for at least one cell, and receives a downlink signal for the CoMP signal for the CoMP on the basis of the acquired information, where the time-resource region information includes a length of a time region contained in a specific subframe to which the downlink signal for the CoMP is transmitted.

The time-resource region information may include a length of a downlink pilot time slot (DwPTS) of a special subframe of the at least one cell.

If the DL signal for the CoMP is transmitted from special subframes of at least two cells, the information of the time-resource region may include a minimum value from among the DwPTS length of the special subframes.

The time-resource region information may be received through higher layer signaling.

The time-resource region information may be indicated by a specific field contained in downlink control information.

The time-resource region information may be cell-specifically configured.

The processor may be configured to measure a channel quality of the time-resource region.

It is to be understood that both the foregoing general description and the following detailed description of the present invention are exemplary and explanatory and are intended to provide further explanation of the invention as claimed.

Advantageous Effects

As is apparent from the above description, exemplary embodiments of the present invention can efficiently receive downlink signals.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 5 is a block diagram illustrating Multiple Input Multiple Output (MIMO) scheme for use in a 3GPP LTE/LTE-A system.

FIG. 6 is a conceptual diagram illustrating a wireless communication system according to embodiment(s) of the present invention.

FIG. 7 is a conceptual diagram illustrating a UL-DL configuration and a special subframe for use in a wireless communication system according to embodiment(s) of the present invention.

FIG. 8 is a conceptual diagram illustrating a UL-DL configuration and a special subframe for use in a wireless communication system according to embodiment(s) of the present invention.

FIG. 9 is a conceptual diagram illustrating a UL-DL configuration and a special subframe for use in a wireless communication system according to embodiment(s) of the present invention.

BEST MODE

Figure 1:
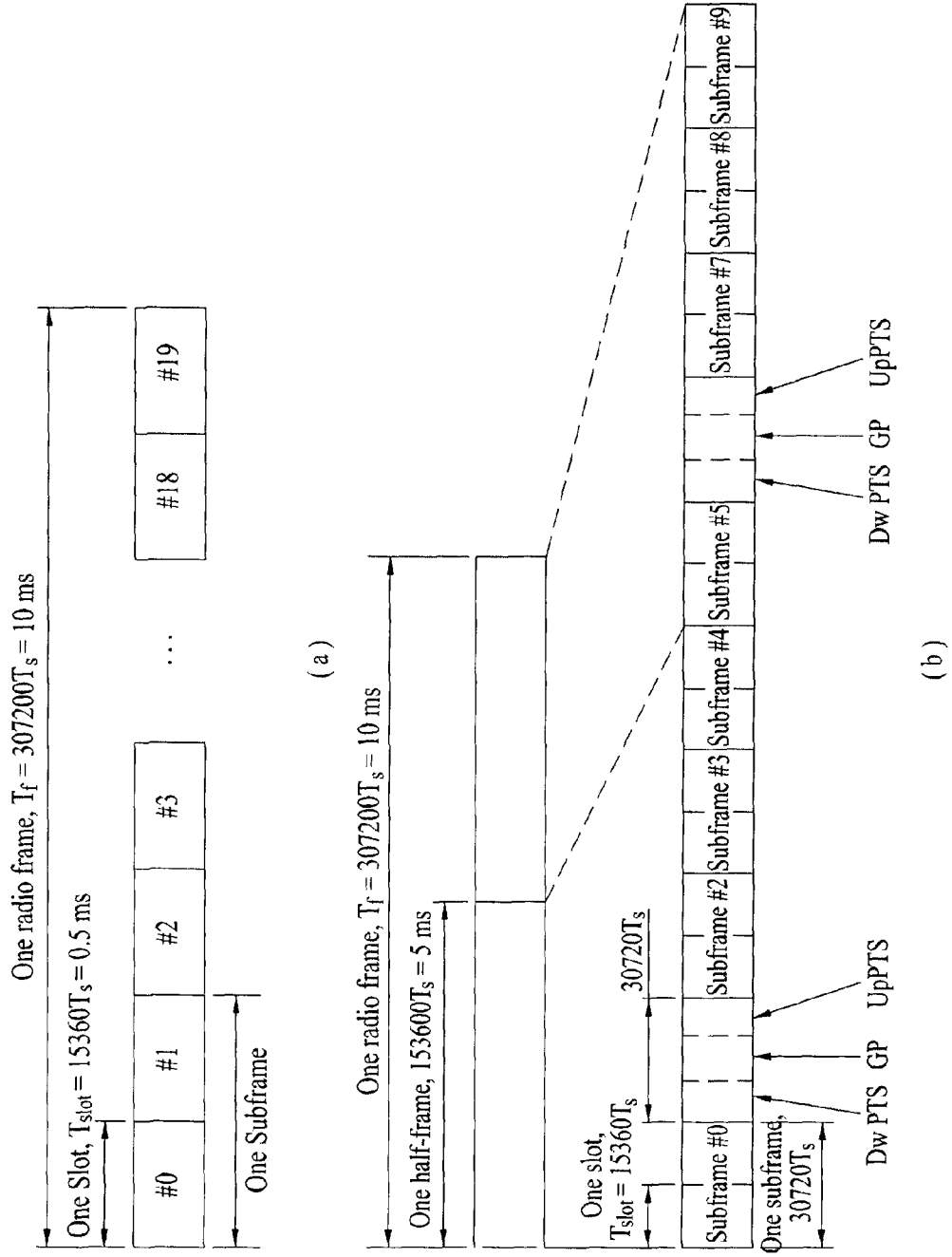
FIG. 1 exemplarily shows a radio frame structure for use in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | | Normal cyclic prefix in downlink | | | Extended cyclic prefix in downlink | | |
|---|---|---|---|---|---|---|---|
| | | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
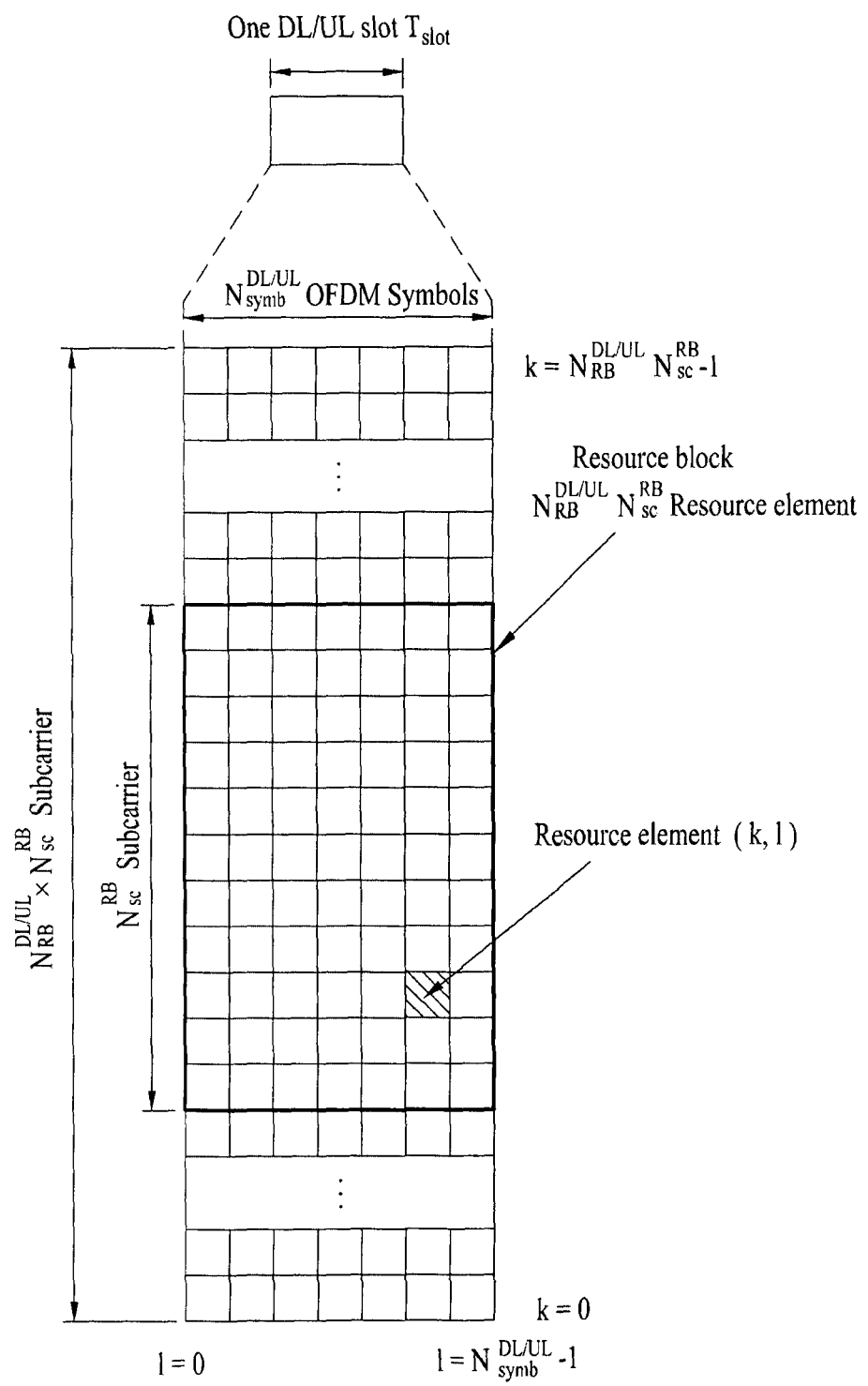
FIG. 2 exemplarily shows a downlink/uplink (DL/UL) slot structure for use in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index).

Figure 3:
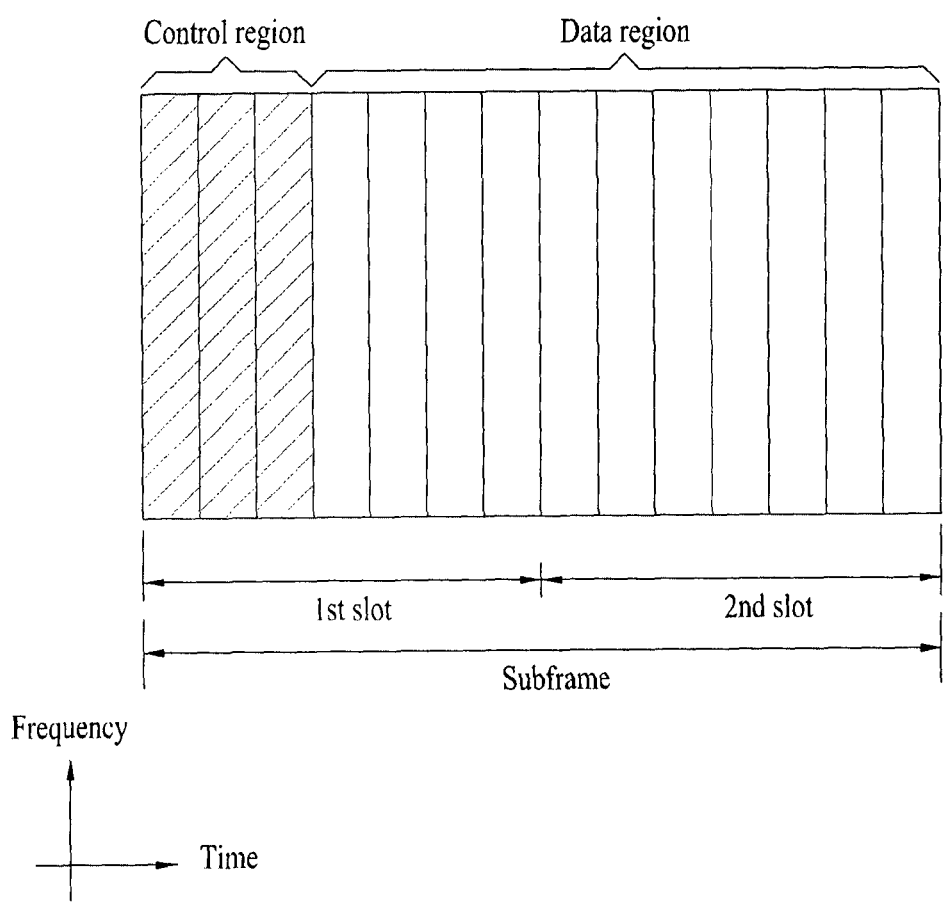
FIG. 3 exemplarily shows a downlink (DL) subframe structure for use in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot.

Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
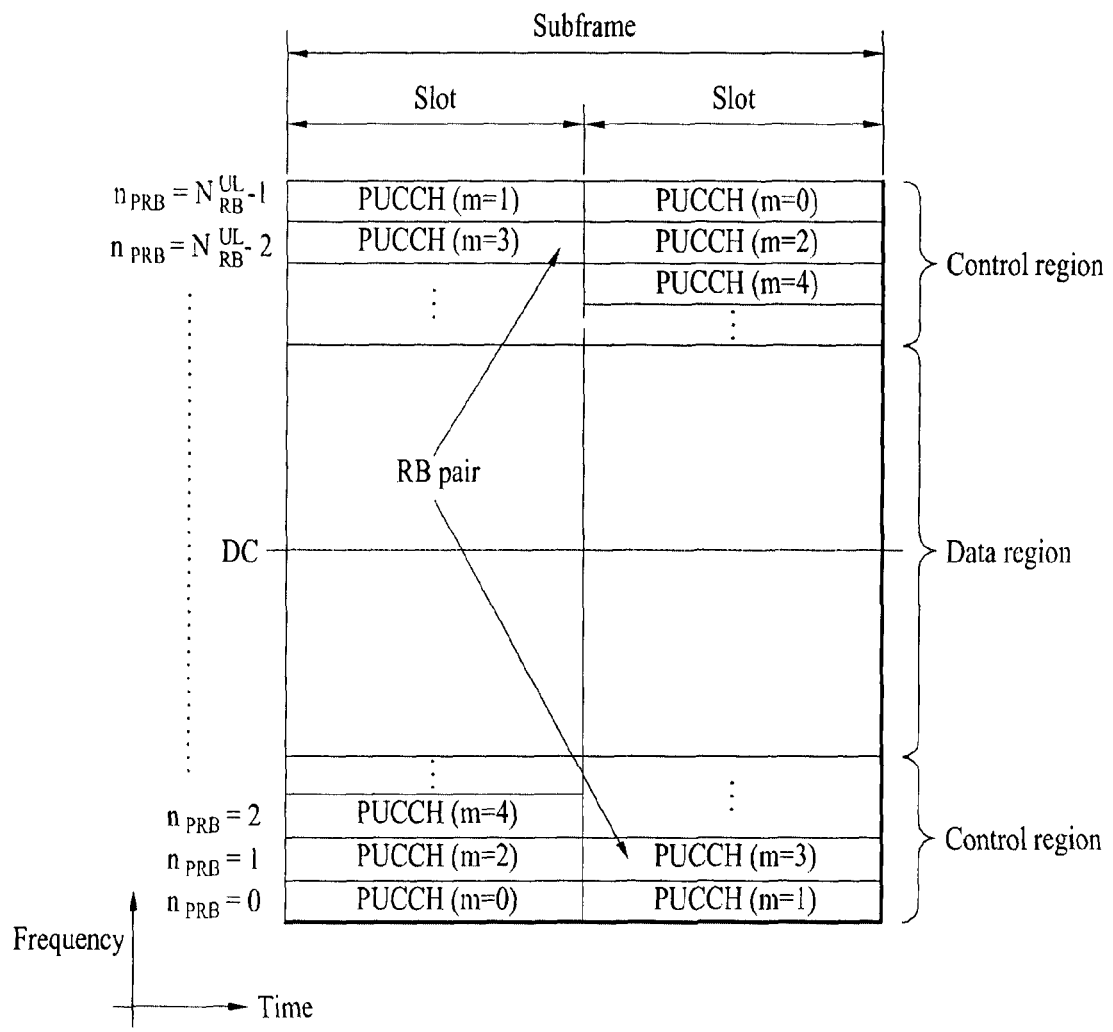
FIG. 4 exemplarily shows an uplink (UL) subframe for use in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE/LTE-A.

TABLE 3

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 3, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

FIG. 5 illustrates configurations of wireless communication systems including multiple antennas.

Referring to FIG. 5(a), when the number of Tx antennas and the number of Rx antennas are respectively to $N_T$ and $N_R$, a theoretical channel transmission capacity is increased, compared to use of a plurality of antennas at only one of a transmitter and a receiver. The channel transmission capacity is increased in proportion to the number of antennas. Therefore, transmission rate and frequency efficiency can be increased remarkably. Given a maximum transmission rate $R_o$ that may be achieved with a single antenna, the transmission rate may be increased, in theory, to the product of $R_o$ and a transmission rate increase rate $R_i$ illustrated in Equation 1 due to an increase in channel transmission capacity in case of multiple antennas.

$$R_i = \min(N_T, N_R) \quad \text{[Equation 1]}$$

For instance, a MIMO communication system with 4 Tx antennas and 4 Rx antennas may achieve a four-fold increase in transmission rate theoretically, relative to a single-antenna system.

Communication in a MIMO system will be described in detail through mathematical modeling. It is assumed that $N_T$ Tx antennas and $N_R$ Rx antennas exist.

Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vectors may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector X, which may be determined by Equation 5.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{12} & w_{12} & \ldots & w_{2N_T} \\ \vdots & & \ddots & \\ w_{i2} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Equation 5]}$$

$$W\hat{s} = WPs$$

Here, $w_{ij}$ denotes a weight between an i-th Tx antenna and j-th information. W is also called a precoding matrix.

Given $N_R$ Rx antennas, signals received at the respective Rx antennas, $y_1, y_2, \ldots, y_{N_R}$ may be represented as the following vector.

$$y = [y_1, y_2, \ldots, y_{N_R}]^T \quad \text{[Equation 6]}$$

When channels are modeled in the MIMO communication system, they may be distinguished according to the indexes of Tx and Rx antennas and the channel between a j-th Tx antenna and an i-th Rx antenna may be represented as $h_{ij}$. It is to be noted herein that the index of the Rx antenna precedes that of the Tx antenna in $h_{ij}$.

FIG. 5(b) illustrates channels from $N_T$ Tx antennas to an i-th Rx antenna. The channels may be represented as vectors and matrices by grouping them. As illustrated in FIG. 5(b), channels from the $N_T$ Tx antennas to an i-th Rx antenna may be expressed as follows.

$$h_i^T = [h_{i1}, h_{i2}, \ldots, h_{iN_T}] \quad \text{[Equation 7]}$$

Also, all channels from the $N_T$ Tx antennas to the $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & & \ddots \\ h_{N_R1} & h_{N_R2} & \ldots & h_{N_RN_T} \end{bmatrix} \quad \text{[Equation 8]}$$

Actual channels experience the above channel matrix H and then are added with Additive white Gaussian noise (AWGN). The AWGN $n_1, n_2, \ldots, n_{N_R}$ added to the $N_R$ Rx antennas is given as the following vector.

$$n = [n_1, n_2, \ldots, n_{N_R}]^T \quad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \quad \text{[Equation 10]}$$

$$\begin{bmatrix} h_{11} & h_{12} & \ldots & h_{1N_T} \\ h_{12} & h_{12} & \ldots & h_{2N_T} \\ \vdots & & \ddots & \\ h_{i2} & h_{i2} & \ldots & h_{iN_T} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_R} \end{bmatrix} + \begin{bmatrix} n_1 \\ n_2 \\ \vdots \\ n_i \\ \vdots \\ n_{N_R} \end{bmatrix} = Hx + n$$

In the meantime, the numbers of rows and columns in the channel matrix H representing channel states are determined according to the numbers of Tx and Rx antennas. The number of rows is identical to that of Rx antennas, $N_R$ and the number of columns is identical to that of Tx antennas, $N_T$. Thus, the channel matrix H is of size $N_R \times N_T$.

The rank of a matrix is defined as the smaller between the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \quad \text{[Equation 11]}$$

If the matrix is eigenvalue-decomposed, its rank may be defined as the number of non-zero eigenvalues. Similarly, in case of singular value decomposition (SVD), the rank may be defined as the number of non-zero singular values. Therefore, the rank of a channel matrix physically means the maximum number of different pieces of information that can be transmitted on given channels.

CoMP (Coordinated Multiple Point) Transmission and Reception Operation

FIG. 6 is a conceptual diagram illustrating a network structure for use in a CoMP (Coordinated Multiple Point) transmission and reception scheme according to one embodiment of the present invention. FIG. 5 is a conceptual diagram illustrating a heterogeneous network (HetNet) environment in which the CoMP UE connected to different DL/UL serving cells is connected to the serving cells. Although FIG. 6 shows four eNBs ($TP_1$, $TP_2$, $TP_3$, $TP_4$) and four UEs, the scope or spirit of the present invention is not limited thereto and many more eNBs and many more UEs can also be present in the above network structure.

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

In 3GPP LTE Rel-11, a UE acting as a target of the CoMP scheme can estimate a channel of TPs capable of provisionally participating in the CoMP using CSI-RS (channel state information reference signal) resources defined as a CoMP measurement set, and feeds back CSI (such as PMI (precoding matrix indicator), CQI (channel quality indicator), RI (rank indicator), etc.) to its own serving cell on the basis of the estimated channel value. In the network, the UE may establish a Dynamic Point Selection (DPS) scheme in which s a TP having a relatively-superior channel quality is selected on the basis of the feedback CSI and data is transmitted to the UE, the CS/CB (coordinated scheduling/ coordinated beamforming) scheme in which TPs participating in the CoMP control scheduling and beamforming so as to reduce inter-interference, and a Joint Transmission (JT) scheme in which TPs participating in the CoMP transmit the same data to the UE.

In downlink of a TDD wireless communication system according to the embodiments, under the condition that a plurality of transmission points (TPs) participates in the CoMP scheme (and transmits data to a specific UE, when the TPs participating in the CoMP scheme uses a special subframe, some TPs use a special subframe, and the remaining TPs use a DL subframe, a method for statically or dynamically informing the UE of information of a specific region to which actual CoMP data is transmitted is proposed, and assumption of a new UE for calculating a channel quality indicator (CQI) under the above-mentioned environment is also proposed.

The TDD wireless communication system is configured to perform data Tx/Rx processes of UL and DL in different time resources. Therefore, a radio frame of the TDD wireless communication system is generally classified into a time resource region for UL data transmission, a time resource region for UL data transmission, and a time resource region for UL/DL or DL/UL switching. For example, in the case of the 3GPP LTE system, the radio frame structure for supporting the TDD scheme is defined as shown in FIG. 1($b$) and Table 1.

In addition, a specific subframe configuration is exemplarily shown in Table 2, and a detailed description thereof will hereinafter be described in detail. The specific subframe includes a subframe (e.g., D) allocated for DL data transmission according to UL-DL configuration, a subframe (e.g., U) allocated for UL data transmission, and a special subframe (e.g., S) composed of DwPTS (downlink pilot time slot), GP (guard period), and UpPTS (uplink pilot time slot). In the special subframe, DwPTS supports DL data transmission (e.g., PDSCH), GP is used as a UE switching time from DL reception to UL transmission, and UpPTS may support sounding reference signal (SRS) or PRACH (physical random access channel).

When the CoMP scheme is used in DL of the TDD wireless communication system, a resource region in which the CoMP scheme is possible may be restricted according to a radio frame configuration (e.g., UL-DL configuration, special subframe configuration, etc.) of TPs participating in the CoMP scheme. First of all, assuming that TPs participating in the CoMP scheme have the same UL-DL configuration, the CoMP scheme may be supported by a DL subframe or a DwPTS of a special subframe. However, assuming that TPs have different special subframe configurations, the DwPTS length of a special subframe may be differently established in individual TPs. Therefore, a resource region in which all TPs participating in the CoMP scheme commonly perform PDSCH transmission may be decided by the shortest-length DwPTS.

FIG. 7 is a conceptual diagram illustrating the above-mentioned example. In more detail, when $TP_1$ and $TP_2$ based on the TDD scheme perform the CoMP scheme on DL, $TP_1$ and $TP_2$ have different special subframe configurations simultaneously while having the same UL-DL configuration. In FIG. 7, assuming that $TP_1$ and $TP_2$ perform serving of only one UE (not shown) through the CoMP scheme such as joint transmission, it is preferable that DL data is transmitted only to some regions of DwPTS in the special subframe. More preferably, the DL data may be transmitted to the UE at an overlap part of the special subframes of two TPs. That is, the DL data may be transmitted to the UE at a specific part (19760•TS) corresponding to an overlap part between a DwPTS of TP$_1$ and a DwPTs of TP$_2$.

In another example, if UL-DL configurations of TP$_1$ and TP$_2$ are different from each other, the CoMP scheme can be supported in either a specific region in which UL-DL configurations of two TPs are defined as DL subframes or another region in which a UL-DL configuration of one TP is a DL subframe and a UL-DL configuration of the remaining TPs is a DwPTS region of a special subframe. In the latter case, the RE region in which the CoMP scheme is possible may be restricted by DwPTS of the special subframe. FIG. 8 is a conceptual diagram illustrating an example of the above latter case.

Considering the above-mentioned example, when a special subframe for the TDD scheme is used in the CoMP scheme, the UE needs to define one region in which actual data transmission is possible and another region in which a data region for CQI calculation in a different way from the conventional art.

Therefore, in order to enable the TDD wireless communication system to support the CoMP scheme, in the case where TPs participating in the CoMP scheme use a special subframe or in another case where some TPs use a special subframe and the remaining TPs use a DL subframe, the embodiments propose a method for statically or dynamically informing the UE of specific information of a transmission region of the actual CoMP data, and also propose associated CQI calculation processes. The detailed embodiment assumes the CoMP execution environment in which CoMP is carried out in TDD of the 3GPP LTE system.

First Embodiment

In a DL data transmission section in which all or some parts of TPs participating in the CoMP scheme according to one embodiment use a special subframe, the first embodiment may semi-statically inform a UE of specific information regarding DL data transmission based on the CoMP scheme. First of all, an exemplary case in which all TPs participate in the CoMP scheme using a special subframe will hereinafter be described in detail. As shown in FIG. 7, in the case where TPs participating in the CoMP scheme have the same UL-DL configuration and have different special subframe configurations, a specific region in which data can be transmitted through the CoMP scheme is unavoidably restricted. For example, if the JT scheme is applied to the example of FIG. 7, a specific region in which DL data transmission is possible in TP$_1$ and TP$_2$ of the special subframe is identical to a common DL data transmission region between special subframes transmitted from TP$_1$ and TP$_2$. That is, a DL data transmission region may be restricted by a specific length corresponding to the shortest DwPTS length from among DwPTSs of special subframes.

In accordance with another embodiment, an exemplary case in which some TPs participate in the CoMP scheme using the special subframe will hereinafter be described in detail. Assuming that TPs participating in CoMP have different UL-DL configurations as shown in FIG. 8, a specific region in which data can be transmitted through the CoMP scheme is also limited. For example, assuming that the JP scheme is applied to the example of FIG. 8, TP$_1$ may transmit DL data at a special subframe, and TP$_2$ may transmit DL data at a DL subframe. A common region in which DL data transmission is possible is identical to the DwPTS length of the special subframe of TP$_1$.

Therefore, the embodiments propose a method for informing a UE of a data transmission region applicable for the CoMP scheme through higher layer signaling such as RRC signaling. For example, in a specific section in which all or some parts of TPs participating in the CoMP scheme use the special subframe, the embodiment may inform the UE of information regarding a common region of DL data transmission lengths of the TPs. That is, in accordance with the 3GPP LTE system, a minimum DwPTS value from among DwPTS values contained in special subframes of TPs participating in the CoMP scheme during the above section is established as a DL CoMP transmission region, such that the established information may be notified to the UE through UE-specific RRC signaling.

Second Embodiment

In a DL data transmission section in which all or some parts of TPs participating in the CoMP scheme according to one embodiment use a special subframe, the second embodiment may dynamically inform a UE of specific information regarding DL data transmission based on the CoMP scheme. The above-mentioned scheme for semi-statically informing the UE of a data transmission region may restrict the operation of a specific CoMP scheme.

In FIG. 7, assuming that all TPs participating in the CoMP scheme are applied to the CoMP scheme (for example, DPS scheme) of a special subframe and data is transmitted at the special subframe of TP$_1$, DL data can be transmitted in a region corresponding to the DwPTS length (19760•TS) based on subframe configuration 1. In contrast, when data is transmitted in a special subframe of TP$_2$, DL data can be transmitted within a region corresponding to the DwPTS length (26336•TS) based on special subframe configuration 4.

However, as can be seen from the above semi-static scheme, if the embodiment decides to use a minimum value of DwPTS values contained in the specific subframes of TPs participating in the CoMP, only a data region (i.e., a region of 19760•TS) corresponding to a TP$_1$-based DwPTS length is utilized on the condition that TP$_2$ is selected by the DPS scheme, resulting in the occurrence of a waste of resources.

The above-mentioned case in which some TPs participate in the CoMP scheme using the special subframe will hereinafter be described in detail. If the DPS scheme is applied to the example of FIG. 8 in a similar way to the example of FIG. 7, DL data can be transmitted in a region corresponding to the DwPTS length of the special subframe at TP$_1$, and DL data can be transmitted in a total region of a DL subframe at TP$_2$.

In association with the above-mentioned two cases, assuming that using a minimum value of DwPTS values contained in the special subframes of TPs participating in the CoMP scheme is established as shown in the example of the semi-static scheme, only a data region corresponding to the TP$_1$-based DwPTS length can be utilized when TP$_1$ is selected by the DPS scheme, resulting in the occurrence of a waste of resources.

Therefore, one embodiment of the present invention provides a method for informing a UE of a data transmission region using a conventional bit field or additional bit field of a DCI format under the above-mentioned situation. For example, in the case of utilizing the legacy bit field, a method for linking the DwPTS length to the value of nSCID capable of dynamically indicating a Virtual Cell ID (VCI) of DM-RS may be considered and used. That is, the DwPTS length may be linked to the value of nSCID designated by bit(s) indicating a scrambling ID of DCI format, antenna port(s), and bit(s) indicating the scrambling ID and the number of layers.

In the example of FIG. 7, a DwPTS length (19760·Ts) may be linked to VCI of DM-RS at $TP_1$, and a DwPTS length (26336·Ts) may be linked to VCI of DM-RS at $TP_2$. Alternatively, 5 DwPTS values for use in the LTE TDD scheme acting as an example for configuring an additional bit field to DCI format may be dynamically notified to the UE. The additional bit field is used to dynamically indicate the DwPTS length at the special subframe, and may be used as a virtual CRC bit in the remaining regions.

Third Embodiment

When UL-DL configurations between TPs participating in the CoMP scheme are different from each other according to another embodiment, a method for defining UL-DL configuration for the CoMP scheme will hereinafter be described in detail. For example, the DL CoMP scheme shown in FIG. 8 may be applied to one case in which all of $TP_1$ and $TP_2$ use a DL subframe, one of $TP_1$ and $TP_2$ uses DwPTS of the special subframe, and the other one uses the DL subframe. From the above-mentioned viewpoint, the UL-UL configuration for the DL CoMP scheme may be defined as a common set of TPs participating in the CoMP scheme. For example, as can be seen from a DL subframe for use in the CoMP scheme shown in FIG. 8, UL-DL configuration of $TP_1$ and UL-Dl configuration of $TP_2$ correspond to DL subframes, the special subframe of the CoMP scheme is set to the corresponding subframe in which any one of the UL-DL configurations of $TP_1$ and $TP_i$ is used as the special subframe, and the remaining subframes may be set to UL subframes. FIG. 9 shows an exemplary UL-DL configuration for the newly configured CoMP scheme.

In this case, the UL-DL configuration for the CoMP scheme may be transferred to the UE through higher layer signaling such as RRC, or may be associated with a VCI of a DM-RS of TPs participating in the CoMP scheme. In 3GPP LTE Rel-11, two VCI values for DM-RS sequence is transferred to the UE through RRC signaling, and one of two VCIs may be dynamically selected on a subframe basis through the value of nSCID indicated by a specific bit of the DCI format. In this case, assuming that a specific VCI from among the VCI values is utilized for the CoMP scheme, the CoMP-dedicated UI-DL configuration shown in FIG. 8 can be applied to the corresponding VCI.

Fourth Embodiment

In accordance with more general operations of another embodiment, the fourth embodiment proposes a method for mapping the TDD-based UL-DL configuration and a special subframe to a specific state of signals transferred to the UE. For example, in the 3GPP LTE system, CRS pattern indication, rate matching pattern indication, or nSCID information may represent any one of a plurality of states. In this case, the CoMP UL-DL configuration and the special subframe may be associated to a specific state capable of implying the CoMP scheme as necessary. As described above, VCI related to initialization of the DM-RS sequence is dynamically selected by the nSCID value indicated by a specific DCI. In this case, DwPTS or UL-DL configuration of the special subframe may be mapped to the nSCID value indicating the VCI implying the CoMP scheme.

Fifth Embodiment

In association with the DL data transmission section in which all or some of TPs participating in the CoMP scheme use the special subframe according to another embodiment, the following description will describe a data region assumed by the UE for CQI calculation. First of all, when the UE calculates a CQI index in LTE standard 3GPP TS 36.213, the following assumption is defined.

In the CSI reference resource, the UE shall assume the following for the purpose of deriving the CQI index, and if also configured, PMI and RI:

- The first 3 OFDM symbols are occupied by control signalling
- No resource elements used by primary or secondary synchronisation signals or PBCH
- CP length of the non-MBSFN subframes
- Redundancy Version 0
- If CSI-RS is used for channel measurements, the ratio of PDSCH EPRE to CSI-RS EPRE is as given by higher layer signaling
- For transmission mode 9 CSI reporting:
    CRS REs are as in non-MBSFN subframes;
    If the UE is configured for PMI/RI reporting, the UE-specific reference signal overhead is consistent with the most recent reported rank; and PDSCH signals on antenna ports $\{7 \ldots 6+v\}$ for v layers would result in signals equivalent to corresponding symbols transmitted on antenna ports $\{15 \ldots 14+P\}$, as given by $$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix},$$

where $x(i)=[x^{(0)}(i) \ldots x^{(v-1)}(i)]^T$ is a vector of symbols from the layer mapping, $P \in \{1,2,4,8\}$ is the number of CSI-RS ports configured, and if only one CSI-RS port is configured, $W(i)$ is 1, otherwise $W(i)$ is the precoding matrix corresponding to the reported PMI applicable to $x(i)$. The corresponding PDSCH signals transmitted on antenna ports $\{15 \ldots 14+P\}$ would have a ratio of EPRE to CSI-RS EPRE equal to the ratio given by higher layer signaling.

- Assume no REs allocated for CSI-RS and zero-power CSI-RS
- Assume no REs allocated for PRS
- The PDSCH transmission scheme depending on the transmission mode currently configured for the UE (which may be the default mode).
- If CRS is used for channel measurements, the ratio of PDSCH EPRE to cell-specific RS EPRE is as given by higher layer signaling with the exception of $\rho_A$ which shall be assumed to be
    $\rho_A = P_A + \Delta_{offset} + 10 \log_{10}(2)$ [dB] for any modulation scheme, if the UE is configured with transmission mode 2 with 4 cell-specific antenna ports, or transmission mode 3 with 4 cell-specific antenna ports and the associated RI is equal to one;
    $\rho_A = P_A + \Delta_{offset}$ [dB] for any modulation scheme and any number of layers, otherwise.

The shift $\Delta_{offset}$ is given by the parameter nomPDSCH-RS-EPRE-Offset which is configured by higher-layer signalling.

In this case, when calculating the CQI index in the data transmission section in which all or some of TPs participating in the CoMP scheme use the special subframe, the above-mentioned assumption may be changed as necessary. An actual data transmission region for the CoMP scheme is reflected, such that a CQI of a common data region between the special subframe and the DL subframe can be calculated as shown in the above-mentioned example.

For example, assuming that all or some of TPs participating in the CoMP scheme use the special subframe according to one embodiment of the present invention, it is assumed that a minimum DwPTS length from among DwPTSs of all the special subframes is signaled to the UE through higher layer signaling. In this case, the UE may assume that PDSCH is not transmitted to OFDM symbols, each of which is longer than the DwPTS length, during the CQI calculation of the subframe.

Alternatively, during the CQI calculation for each CSI-RS resource, the present invention may satisfy the data transmission region of a TP to which the corresponding CSI-RS resource is transmitted. For example, assuming that some TPs participating in the CoMP scheme use the special subframe, the data region for CQI calculation of a plurality of CSI-RS resources may have different UE assumptions not only according to whether the subframe of the TP to which the corresponding CSI-RS resource is transmitted is the DL subframe or the special subframe, but also according to a difference in DwPTS length of the special subframes.

For example, as can be seen from FIG. 7, CSI-RS resource 1 is transmitted from $TP_1$ and CSI-RS resource 2 is transmitted from $TP_2$. In the case of CQI of the special subframe, $CQI_1$ may be calculated per CSI-RS resource 1, $CQI_2$ may be calculated per CSI-RS resource 2. In the case of calculating $CQI_1$, the DwPTS length (19760•Ts) according to the special subframe configuration of $TP_1$ should be considered in the present invention. In the case of calculating $CQI_2$, the DwPTS length (26336•Ts) according to the special subframe configuration of $TP_2$ must be considered in the present invention.

Figure 10:
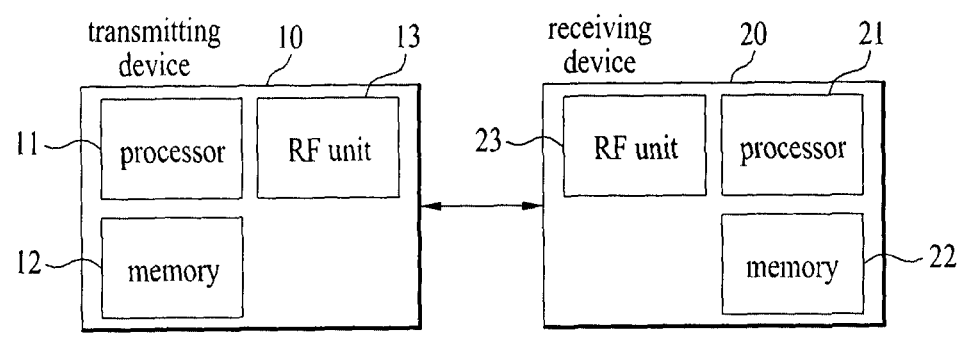
FIG. 10 is a block diagram illustrating an apparatus applicable to embodiment(s) of the present invention.

FIG. 10 is a block diagram of a transmitting device 10 and a receiving device 20 configured to implement exemplary embodiments of the present invention. Referring to FIG. 10, a transmitting device 10 and a receiving device 20 respectively include Radio Frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and controlling the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to perform the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the exterior. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a Medium Access Control (MAC) layer. One Transport Block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr (where Nr is a positive integer) receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wish to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A Reference Signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on an uplink and as the receiving device 20 on a downlink. In embodiments of the present invention, an eNB or BS serves as the receiving device 20 on an uplink and as the transmission device 10 on a downlink.

The transmitting device and/or the receiving device may be configured as a combination of one or more embodiments of the present invention.

The detailed description of the exemplary embodiments of the present invention has been given to enable those skilled in the art to implement and practice the invention.

Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The method and apparatus for receiving or transmitting a radio frequency (RF) signal according to embodiments of the present invention can be applied to a UE, a BS (eNB), or other communication devices in a wireless communication system.

The invention claimed is:

1. A method for receiving a downlink signal by a user equipment (UE) in a Time Division Duplex (TDD) wireless communication system supporting Coordinated Multi-point (CoMP) transmission and reception in which at least two cells having different uplink-downlink (UL-DL) configurations or different special subframe configurations participate, the method comprising:
    acquiring, by the UE, information of a time-resource region in which a downlink signal for the CoMP transmission and reception is received from at least one cell of the at least two cells; and
    receiving, by the UE from the at least one cell, the downlink signal for the CoMP transmission and reception using the acquired information of the time-resource region,
    wherein the acquired information of the time-resource region includes a length of a time region in a specific subframe in which the downlink signal for the CoMP transmission and reception is received from the at least two cells having different UL-DL configurations or different special subframe configurations participate, and
    wherein if the downlink signal for the CoMP transmission and reception is transmitted in special subframes of at least two cells having the same UL-DL configuration and different special subframe configurations, the acquired information of the time-resource region includes a minimum value from among lengths of a downlink pilot time slot (DwPTS) of the special subframes.

2. The method according to claim 1, wherein the acquired information of the time-resource region includes a length of a DwPTS of a special subframe of the at least one cell.

3. The method according to claim 1, wherein the acquired information of the time-resource region is received through higher layer signaling.

4. The method according to claim 1, wherein the acquired information of the time-resource region is indicated by a specific field contained in downlink control information.

5. The method according to claim 4, wherein the acquired information of the time-resource region is cell-specifically configured.

6. The method according to claim 1, further comprising: calculating a channel quality of the time-resource region.

7. A user equipment (UE) configured to receive a downlink signal in a Time Division Duplex (TDD) wireless communication system supporting Coordinated Multi-point (CoMP) transmission and reception in which at least two cells having different uplink-downlink (UL-DL) configurations or different special subframe configurations participate, the UE comprising:
    a radio frequency (RF) unit; and
    a processor configured to:
    control the RF unit,
    acquire information of a time-resource region in which a downlink signal for the CoMP transmission and reception is received from at least one cell of the at least two cells, and
    receive, from the at least one cell, the downlink signal for the CoMP transmission and reception using the acquired information of the time-resource region,
    wherein the acquired information of the time-resource region includes a length of a time region in a specific subframe in which the downlink signal for the CoMP transmission and reception is received from the at least two cells having different UL-DL configurations or different special subframe configurations participate, and
    if the downlink signal for the CoMP transmission and reception is transmitted in special subframes of at least two cells having the same UL-DL configuration and different special subframe configurations, the acquired information of the time-resource region includes a minimum value from among lengths of downlink pilot time slot (DwPTS) of the special subframes.

8. The UE accordingly to claim 7, wherein the acquired information of the time-resource region includes a length of a DwPTS of a special subframe of the at least one cell.

9. The UE according to claim 7, wherein the acquired information of the time-resource region is received through higher layer signaling.

10. The UE according to claim 7, wherein the acquired information of the time-resource region is indicated by a specific field contained in downlink control information.

11. The UE according to claim 7, wherein the acquired information of the time-resource region is cell-specifically configured.

12. The UE according to claim 7, wherein the processor is further configured to calculate a channel quality of the time-resource region.

13. The method according to claim 1, wherein if the downlink signal for the CoMP transmission and reception is transmitted in a special subframe of a first cell and a downlink subframe of a second cell, the first cell and the second cell having different UL-DL configurations, the acquired information of the time-resource region includes a length of a DwPTS of the special subframe of the first cell.

14. The UE according to claim 7, wherein if the downlink signal for the CoMP transmission and reception is transmitted in a special subframe of a first cell and a downlink subframe of a second cell, the first cell and the second cell having different UL-DL configurations, the acquired information of the time-resource region includes a length of a DwPTS of the special subframe of the first cell.

* * * * *